Figure 3:
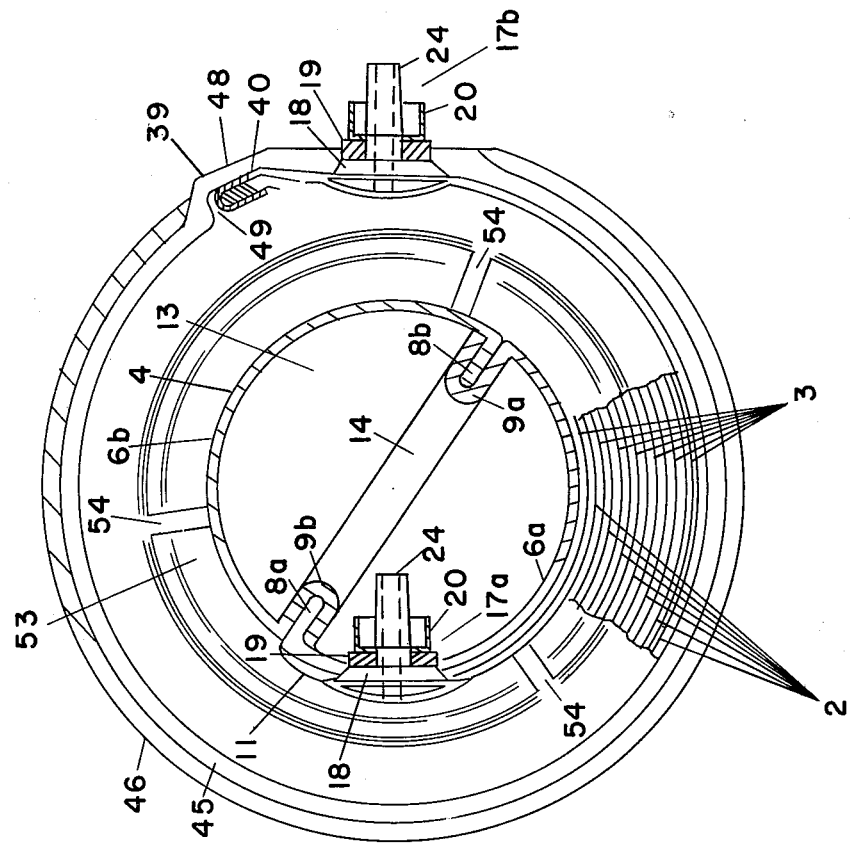

United States Patent [19]

Fecondini et al.

[11] 4,229,305
[45] Oct. 21, 1980

[54] HAEMODIALYZER

[75] Inventors: Luciano Fecondini, Bologna; Andrea Bocchi, Medolla, both of Italy

[73] Assignee: Hospal Ltd., Basel, Switzerland

[21] Appl. No.: 967,901

[22] Filed: Dec. 11, 1978

[30] Foreign Application Priority Data

Dec. 15, 1977 [IT] Italy .................... 69802 A/77

[51] Int. Cl.² .......................................... B01D 31/00
[52] U.S. Cl. ............................ 210/321 B; 210/497.1
[58] Field of Search ........... 210/321 A, 321 B, 321 R, 210/497.1, 387, 459, 227, 494; 206/401, 403; 220/4 B, 4 F; 55/158; 422/48; 242/115

[56] References Cited

U.S. PATENT DOCUMENTS

| | | | |
|---|---|---|---|
| 3,397,790 | 8/1968 | Newby et al. | 210/321 R |
| 3,508,662 | 4/1970 | Miller | 210/321 B |
| 3,712,474 | 1/1973 | Martinez | 210/321 B |
| 3,853,769 | 12/1974 | Miller | 210/321 B |
| 3,880,760 | 4/1975 | Flandoli | 210/321 R |
| 3,962,095 | 6/1976 | Luppi | 210/321 A |
| 4,035,305 | 7/1977 | Miller et al. | 210/321 B |
| 4,059,530 | 11/1977 | Luppi | 210/321 B |

*Primary Examiner*—Thomas G. Wyse
*Assistant Examiner*—David R. Sadowski
*Attorney, Agent, or Firm*—Gerald D. Sharkin; Robert S. Honor; Walter F. Jewell

[57] ABSTRACT

The invention concerns a haemodialyzer of the type comprising a semipermeable flattened tubular membrane wound in spiral configuration from one end with an interposed insert around a mandrel member, means for connecting the interior of said membrane at its ends to conduits for the admission and discharge of blood, the assembly being housed in a casing in which said mandrel member comprises at least two similar elongated elements which are connected together.

14 Claims, 6 Drawing Figures

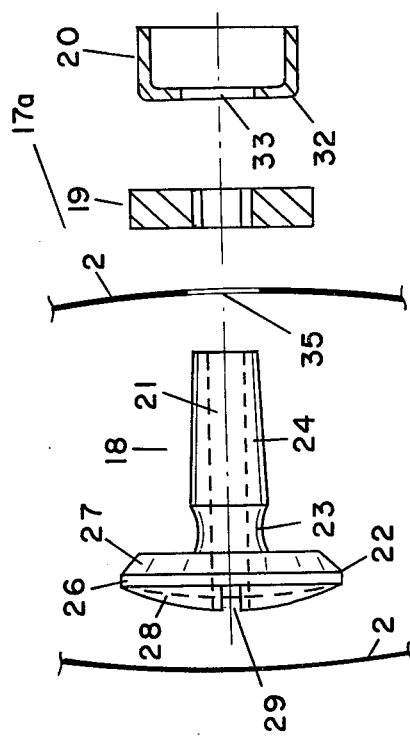
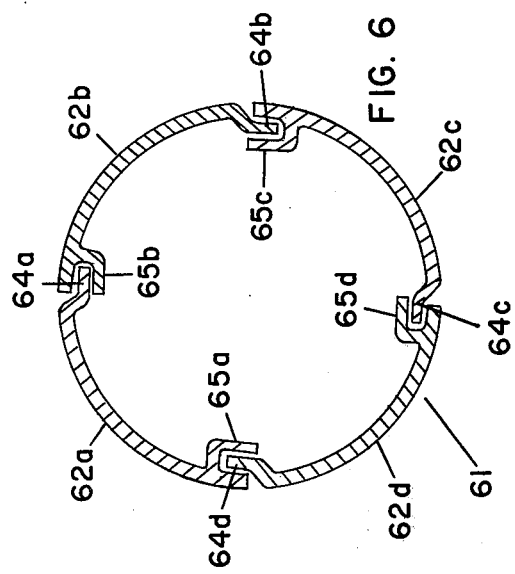
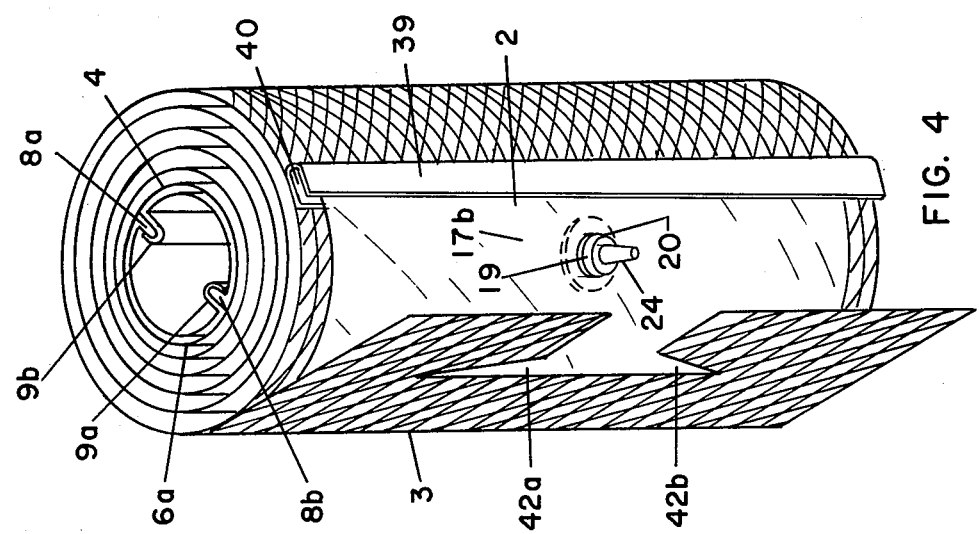

HAEMODIALYZER

The present invention relates to an improvement in a haemodialyzer.

In particular, the present invention relates to an improvement in a haemodialyzer of the type comprising a semipermeable flattened tubular membrane which is wound in a spiral configuration with an interposed insert around an axial support mandrel member and provided with means for associating the interior of the membrane, at its opposite ends, with conduits for the admission and discharge of blood. The assembly formed by the membrane and by the interposed insert is disposed within a substantially cylindrical casing within which a dialysis liquid flows axially, along the outside surface of the tubular membrane, perpendicularly to the flow of blood, in the tubular spirally arranged tubular membrane.

The problems raised by a haemodialyzer of above type concern sealingly closing the ends of the tubular membrane and the connecting membrane ends to the outside conduits. Simplifying of the construction of the various components of the above-mentioned haemodialyzer, in particular the axial mandrel member, in order to keep down the total cost should also be aimed for.

At present, closure of the internal end of the membrane and connection to the corresponding conduit can be achieved by constructing the axial mandrel of three elongated elements which are different from each other. In particular, in a known device, there is provided a first support member to which there is added a second member for providing the connection of the interior of the membrane to the corresponding conduit, and a third blade-like member. This last member, is inserted by a force fit, with the end of the membrane within a groove provided in the first member, in order to provide a sealed closure at that end. Closure of the opposite end of the tubular membrane and connection to the outside of the membrane are effected in a similar manner, but using a first member which is of a different configuration.

In general, a haemodialyzer of the type described above may possess good qualities from the point of view of efficiency of dialysis and reliability; however only at the cost of fitting together a large number of basic components and in particular, the axial mandrel member comprising components for holding the membrane are of relatively complex structure. Producing these latter components therefore requires many production and assembly operations, the consequence of which is that the apparatus is of relatively high overall cost.

The aim of the present invention is to provide a haemodialyzer having all the advantageous features of the known apparatus but which is of simplified construction.

The present invention essentially concerns a haemodialyzer of the type comprising a semipermeable flattened tubular membrane which is wound in a spiral configuration with an interposed insert around an axial support mandrel member, means for connecting the interior of said membrane at its opposite ends to conduits for the admission and discharge of blood, the assembly being housed in a casing which is characterised in that said axial mandrel member comprises at least two similar elongated elements which are connected together.

A particular embodiment of the invention will now be described by way of non-limiting example, for the sake of improved understanding of the present invention, with reference to the accompanying drawings.

Figure 1:
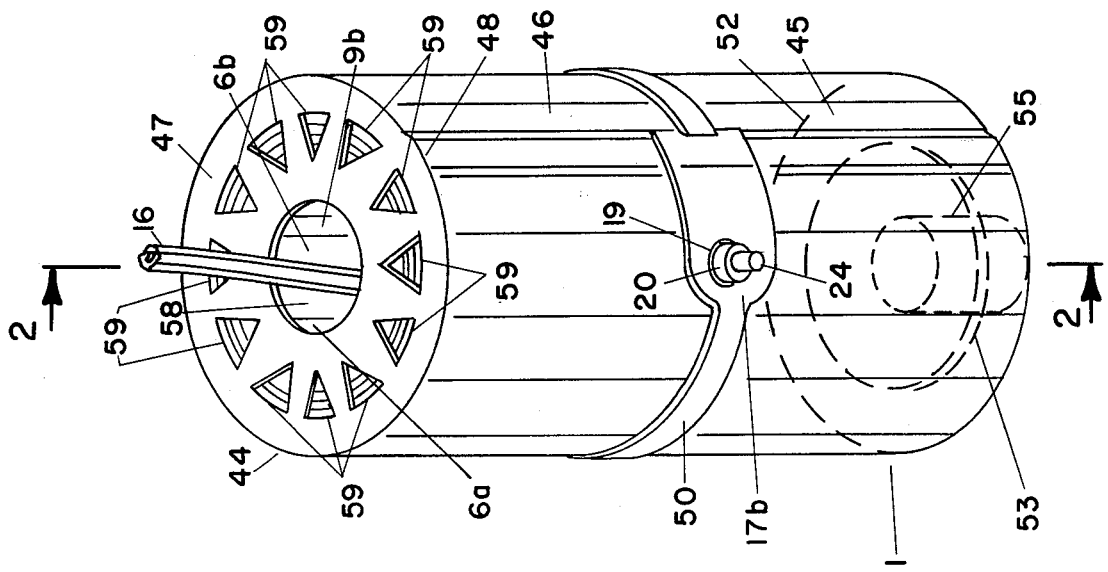
Figure 2:
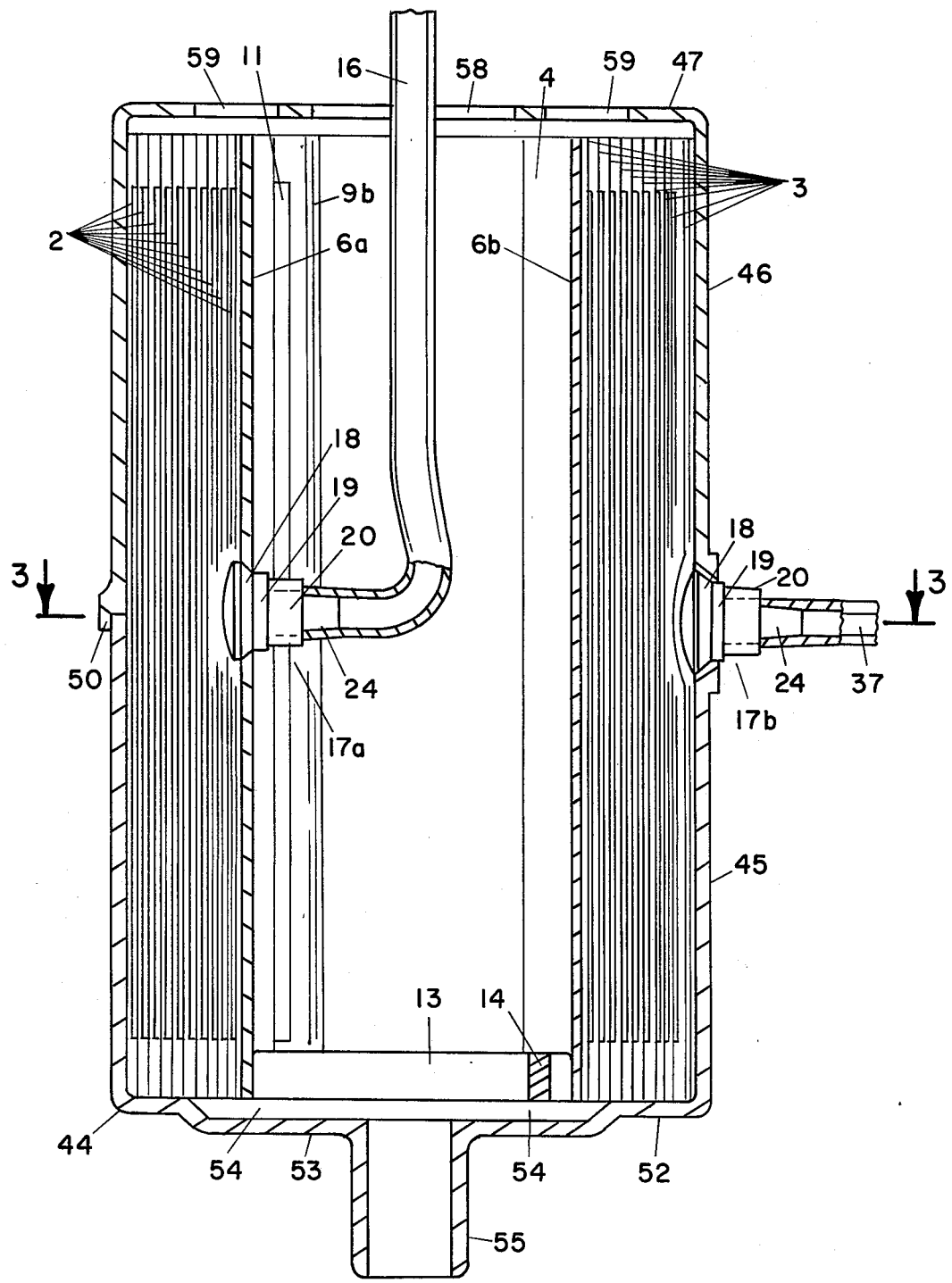

FIG. 1 is a perspective view from above of a haemodialyzer according to the present invention, FIG. 2 is a view on an enlarged sectional view taken along line II—II in FIG. 1, FIG. 3 is a view in section taken along line III—III in FIG. 2, FIG. 4 is a perspective view of the haemodialyzer as shown in FIG. 1, from which some components have been removed for greater clarity, FIG. 5 is an exploded view on an enlarged scale, partially in cross-section, of the detail of the connection provided for the flow of blood, as shown in FIGS. 2 and 3, and FIG. 6 is a view in section of a different embodiment of a detail of the mandrel member shown in FIG. 3.

Referring particularly to FIGS. 1 to 4, reference numeral 1 denotes generally a haemodialyzer comprising a flattened tubular membrane 2 which is wound in a spiral configuration with an interposed insert 3 around an axial support mandrel member 4.

According to the present invention, the mandrel member 4 comprises two similar longitudinal members 6a and 6b which are of a substantially semicircular configuration. Along their opposite longitudinal edges, each of the members 6a and 6b has a rib 8a and 8b and a U-shaped groove 9a and 9b, which extend radially inwardly of the members 6a and 6b themselves. In particular the ribs 8a and 8b and grooves 9a and 9b are so dimensioned as to permit the two members 6a and 6b to be assembled by a frictional connection, by virtue of the rib 8a of the member 6a engaging into the corresponding groove 9b of the other member 6b which is opposite thereto, and vice-versa.

In addition, each of the two members 6a and 6b essentially comprises a sheet which is of a transverse section of constant thickness and which is preferably produced solely by means of a process of extruding a thermoplastic material. After extrusion, the members 6a and 6b are each of an identical transverse configuration; it is sufficient for one such member to be turned over relative to the other member, for the members to be fitted together as described above and for the members to be held connected together by simple friction.

The mandrel member 4 presents a sealed closure to the blood, and permits anchoring of the inside end 11 of the tubular membrane 2, since the tubular membrane is gripped between the facing surfaces of the rib 8a and the corresponding groove 9b of the two longitudinal members 6a and 6b. Finally, the mandrel member 4 is sealingly closed with respect to the dialysis liquid at its base, by virtue of a cover member 13 having a radial groove 14 for receiving therewithin the grooves 9a and 9b of the members 6a and 6b. Adjacent to its end 11, the interior of the membrane 2 is connected to a tube 16 for the admission of the blood to be purified, by way of a connecting means 17a shown in exploded form in FIG. 5 and comprising a connector 18, a washer 19 of elastic deformable material, and a tubular body 20. In particular, the connector 18 has an axial hole 21 and comprises a head portion 22 connected by an intermediate portion 23 of reduced cross-section to a frustoconical portion 24 whose cross-section progressively decreases towards the end remote from the portion 23. The head portion 22 has an intermediate cylindrical portion 26 which is disposed between the frustoconical portion 27 which reduces towards the portion 23, and a peripheral portion 28 which is in the form of a spherical dome provided with a plurality of radial grooves 29 to facilitate circulation of the blood towards the interior of the membrane 2.

The tubular body 20 is closed at one end by a wall portion 32 provided with an axial hole 33 whose diameter is between the diameters of the maximum and minimum sections of the frustoconical portion 24, and is capable of resilient deformation to a value corresponding to the maximum diameter of said portion 24, so that it can be snap-fitted into the intermediate portion 23.

On the basis of the structure described above, the tube 16 can therefore be coupled to the interior of the tubular membrane 2 by introducing the portion 24 of the connector 18, within the membrane 2, into a hole 35 provided in a wall of the membrane itself, and by force-fitting the washer 19 and the tubular body 20 axially along the portion 24 itself, until the wall portion 32 of the body 20 engages into the intermediate portion 23, as shown in FIG. 3.

The connecting means 17a is then disposed within a frustoconical hole (not shown) which extends radially in the longitudinal member 6a and against which the frustoconical portion 27 of the connector is positioned. Similarly, the opposite end of the membrane 2 is connected to a tube 37 (FIG. 2) for discharge of the purified blood, in a similar manner, by way of a connecting means 17b identical to the connecting means 17a. In this case, the end of the membrane 2 is closed downstream of the region of insertion of the connecting means 17b, by using a U-shaped member 39 and a blade-like member 40, which are preferably produced by extrusion and between which said end of the membrane is gripped (FIGS. 3 and 4).

As regards the interposed insert 3 (FIG. 4), this essentially comprises a grill of the type having lozenge-shaped meshes; it is fixed within a member 6a or 6b of the mandrel member 4, for example by means of an adhesive strip (not shown). In addition, adjacent the connecting means 17a and 17b, the insert 3 has cut-out portions 42a and 42b which facilitate the admission or discharge of the blood, by virtue of the absence of any compression force applied by the insert to the outside surface of the membrane 2, at the location of the cut-out portions.

The assembly formed by the tubular membrane 2, the insert 3, the mandrel member 4 and the connecting means 17a and 17b is disposed within a substantially cylindrical containing means 44 which is preferably produced by moulding a plastics material, and which has in particular two upper and lower half-shells, respectively denoted by reference numerals 45 and 46, the half-shells being fitted together along a radial plane adjacent the connecting means 17a and 17b. In particular, assembly of the two half-shells is preferably effected by means of an ultrasonic welding process whereby the internal surface of the annular edge 50 of the upper half-shell 46 is joined to the external surface of the lower half-shell 45 which is opposite thereto. The lateral surface of the containing means 44 has a longitudinal projection 48 to which there corresponds a groove 49 within the containing means; the member 39 with the corresponding blade-like member 40 are housed within the groove 49 (see FIG. 3).

The lower half-shell 45 has a lower base wall portion 52 which is so shaped as to define a circular chamber 53 in which there are radially disposed ribs 54 for stiffening purposes and for supporting the mandrel member 4 with the membrane 2 and the interposed insert 3, which ribs also extend to a tubular conduit 55, for connection to a tube (not shown) for the admission of dialysis liquid.

In contrast, the upper half-shell 46 has an upper end wall 47 provided with a hole 58 forming an axial opening through which passes the tube 16, and also provided with a plurality of triangular openings 59 which are distributed uniformly along a circumference which is coaxial with the hole 58, for discharge of the dialysis liquid.

Finally, referring to FIG. 6, this shows a cross-section of a different embodiment of the support mandrel member 61, comprising in particular four separate equal longitudinal members 62a, b, c, and d, which each extend over a quarter of a circumference so that together they define a substantially circular cross-section. Similarly to the other members 6a and 6b of the mandrel member 4, along their opposite longitudinal edges, each of the members 62a, b, c and d of the mandrel member 61 has a respective rib 64a, b, c, and d and a respective groove 65a, b, c and d, which are intended to be connected respectively to the grooves 65b, c, d and a and the ribs 64d, a, b and c, as shown in FIG. 6.

It will be seen clearly from the whole of the features set out above that the haemodialyzer 1 constructed in accordance with the teaching of the present invention makes it possible to construct a simple coil type dialyser.

A substantially reduced unit cost is achieved, because the longitudinal members 6a and 6b of the mandrel member 4 can be identical and can be produced directly by a simple plastics material extrusion process.

The particular configuration of the members 6a and 6b makes it possible for them to be joined together by friction, by virtue of simply turning one member over relative to the other, the consequence of which is to simplify the assembly operations and also to permit the internal end 11 of the tubular membrane 2 to be closed and anchored, without requiring the use of a specific tool or particular equipment for closing the membrane on itself, as mentioned above.

Using identical connecting means 17a and 17b for connecting the opposite ends of the membrane 2 subsequently simplifies the assembly operations and permits standardised production of such means, with a consequent reduction in the overall cost of the haemodialyzer 1.

In addition, the radial cut-out portions 42 provided in the interposed insert member 3 adjacent each of the connecting means 17 facilitate the admission and discharge of blood and thus improve the performance of the haemodialyzer in question.

By means of the above-mentioned extrusion processes, it is possible to produce the members 6a and 6b of the mandrel member 4, the shaped member 39 and the blade-like member 40, in the desired lengths, so that it is possible to construct various models of haemodialyzer, each model having a different dialysis capacity depending only on the transverse dimensions of the membrane 2, the interposed insert 3 and the height of the two half-shells 45 and 46, as the other half-shell can be used as a reference. From this point of view, the production of the haemodialyzer may be diversified without noticeable influence on the production of the different components.

It will be apparent that modifications and variations may be made in the present invention, without departing from the concept of the invention.

In particular, the axial support mandrel member 4 may be of circular cross-section as described above, or of elliptical section, or any other form, and moreover without any limitation in respect of the number of longitudinal components which form the mandrel member. The longitudinal components may in turn be joined together by various physical means (heat means, with ultrasonics, etc) or chemical means.

What we claim is:

1. A haemodialyzer of the type comprising a semipermeable flattened tubular membrane wound in spiral configuration from one end with an interposed insert around a mandrel member, means for connecting the interior of said membrane at its ends to conduits for the admission and discharge of blood, the assembly being housed in a casing, in which said mandrel member comprises at least two elongated elements of identical transverse configuration which are connected together along their opposite longitudinal edges and one corresponding pair of said opposite longitudinal edges sealingly grips said membrane.

2. A haemodialyzer according to claim 1, in which said elongated members are of a substantially semicircular form.

3. A heamodialyzer according to claim 1, in which said elongated elements have identical cross-sections over all their length.

4. A haemodialyzer according to claim 1, in which the mandrel member is of circular cross-section.

5. A haemodialyzer according to claim 1, in which said elongated elements are connected by mechanical means.

6. A haemodialyzer according to claim 5, in which the mechanical means constitutes a frictional coupling of said elongated elements.

7. A haemodialyzer according to claim 6, in which the elongated elements each comprise ribs and grooves along the longitudinal edges thereof, the rib of one element mating with the groove of another element.

8. A haemodialyzer according to claim 7, in which each elongated element comprises a groove and a rib, and in which the groove and the rib are directed along a plane through a central axis of the mandrel member.

9. A haemodialyzer according to claim 7, in which grooves and ribs extend radially inward of the mandrel member.

10. A haemodialyzer according to claim 7, in which the ribs and grooves are continuous along said longitudinal edges.

11. A haemodialyzer according to claim 10, in which the longitudinal elements are of molded sheet material, the opposing longitudinal edges of which are respectively provided with the rib and the groove.

12. A haemodialyzer according to claim 11, in which the elongated elements have a cross-section of constant thickness.

13. A haemodialyzer according to claim 1, in which the elongated elements comprise mating ribs and grooves along the longitudinal edges thereof and in which the means for sealingly closing and anchoring the one end of the tubular membrane consists of the arrangement of an end section of the membrane between the facing surfaces of the rib and the groove.

14. A haemodialyzer according to claim 1, in which the interposed insert has cut-out portions at their ends, adjacent the connecting means into which the tubular membrane section may expand, in order to facilitate the admission or discharge of blood at ends of the tubular membrane.

* * * * *